2,996,435
Patented Aug. 15, 1961

2,996,435
PROCESS FOR PRODUCING AZASERINE
John Ehrlich, Grosse Pointe Park, Mildred Penner Knudsen, Birmingham, Quentin R. Bartz and Salvatore A. Fusari, Detroit, and Theodore H. Haskell, Clawson, Mich., assignors to Parke, Davis & Company, Detroit, Mich., a corporation of Michigan
No Drawing. Original application Jan. 14, 1953, Ser. No. 331,308. Divided and this application Sept. 15, 1954, Ser. No. 456,338
9 Claims. (Cl. 195—80)

This invention relates to a micro-biological method for producing O-diazoacetyl-l-serine, otherwise known by the common or generic name of azaserine.

This application is a division of application Serial No. 331,308, filed January 14, 1953, now abandoned, which is a continuation-in-part of application Serial No. 267,698, filed January 22, 1952, now abandoned.

O-diazoacetyl-l-serine possesses very unique properties as will appear from the description which follows. This compound contains only the elements carbon, hydrogen, oxygen and nitrogen and has the empirical formula $C_5H_7N_3O_4$. It has a molecular weight of 173.1 and can be represented by the structural formula,

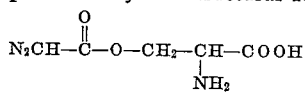

(l) Optical form

O-diazoacetyl-(l)-serine is relatively unstable to heat, and decomposes before melting. The decomposition does not occur at any specific temperature and consequently the decomposition and melting points vary over a wide range depending upon the method used in their determination. Using a Fisher-Johns melting point apparatus, with the temperature being raised at the rate of 1° C. per minute a sample of the compound applied to the stage near the melting point behaves as follows:

150–152° C.—Starts browning
155° C.—Sinters and effervesces
158–159° C.—A clear melt with some slight effervescence When using a copper block raising the temperature 1° C. per minute with the sample enclosed in a sealed capillary tube the results obtained are usually about as follows:

146° C.—Starts sintering
150° C.—Starts browning
154° C.—Completely brown
158° C.—Vigorous decomposition with gas evolution
162° C.—A clear melt with some slight effervescence O-diazoacetyl-(l)-serine is decomposed by aqueous acid with the liberation of 16.18% nitgrogen. Under very mild acid hydrolysis this compound yields nitrogen and O-glycolyl-(l)-serine. More vigorous acid hydrolysis of this compound produces nitrogen, glycollic acid and (l)-serine. Hydrogen binding curves show that $$pK'a = 8.55$$

Another inflection in the titration curve occurs at about pH 4 but this is probably due to a decomposition phenomenon.

The product is very soluble in water but insoluble in the common non-polar organic solvents. It is only very slightly soluble in absolute methanol, absolute ethanol and acetone in the cold but is soluble in warm aqueous solutions of these solvents. O-diazoacetyl-(l)-serine gives positive ninhydrin and naphthoquinone sulfonate tests for α-amino acids. It also gives positive tests with ammoniacal silver nitrate and copper acetate showing the presence of a reducing group. In the Elson-Morgan test an atypical orange color is produced. This compound gives negative tests with Dische, Molisch, Tollen's phloroglucinol, Tollen's resorcinol, aniline acetate, Schiff's fuchsinaldehyde and Pauly reagents.

In aqueous phosphate buffer at pH 7 O-diazoacetyl-(l)-serine shows a characteristic absorption peak of $$E^{1\%}_{1\,cm.} = 1140 \text{ at } \lambda_{max.} = 250.5 \text{ m}\mu$$

In 0.1 normal sodium hydroxide solution after 30 minutes an absorption peak of $$E^{1\%}_{1\,cm.} = 1230 \text{ at } \lambda_{max.} = 252$$

is observed. In 0.1 normal hydrochloric acid little or no absorption is observed. This is probably due to the decomposition of the product under acidic conditions.

O-diazoacetyl-(l)-serine forms metal salts upon reaction with alkali metal or alkaline earth metal hydroxides, carbonates, bicarbonates, oxides, alkoxides, amides and the like.

Even though it is optically active O-diazoacetyl-(l)-serine possesses very little optical rotatory power. An 8.46% solution in water at pH 5.18 shows an $[\alpha]_D^{27.5°}$ C. of $-0.5°$.

O-diazoacetyl-(l)-serine is a light yellow-greenish crystalline solid. The crystals of O-diazoacetyl-(l)-serine are biaxially positive with a moderately high birefringence. Extinction is parallel on elongated cleavage fragments and crystals. The compound probably crystallizes in the orthohombic system. Cleavage fragments and crystals are length fast, are elongated parallel to the β vibration and have an excellent plate cleavage parallel to the α-β plane. Since the crystals tend to lie on this flat surface only two of their indices can be measured. Measurement of these two indices (the α and β) gives the following values:

$$\alpha = 1.523 \pm 0.002$$
$$\beta = 1.607 \pm 0.002$$

The infrared absorption spectrum of O-diazoacetyl-(l)-serine determined using a mineral oil mull composed of the ground crystalline material and a mineral oil known commonly as Nujol shows the following absorption peaks: 3.19, 3.81, 4.66, 5.89, 5.96, 6.22, 6.45, 6.63, 6.90, 7.15, 7.41, 7.57, 7.68, 7.85, 8.08, 8.42, 8.61, 9.12, 9.70, 10.16, 10.32, 10.82, 11.16, 11.66, 11.83, 12.14, 13.26, 13.46, 13.60, and 13.78.

The common or generic name of "azaserine" has been adopted for O-diazoacetyl-(l)-serine.

In accordance with the invention O-diazoacetyl-(l) serine is produced by a microbiological synthetic method which involves cultivating a microorganism called *Streptomyces fragilis* under artificial conditions in a suitable nutrient medium. The details of this procedure are hereinafter described.

*Streptomyces fragilis* is a hitherto unknown microorganism which occurs in soils. It was isolated for the first time from a soil sample collected at Lago San Roque (Cordoba), Argentina. Cultures of this microorganism can be obtained by diluting soil samples containing *Streptomyces fragilis* with sterile water, allowing the heavier particles to settle, plating out the resulting supernatant soil suspension in serial dilutions on nutrient agar plates, incubating at 24 to 28° C., and transplanting selected individual growths resembling *Streptomyces fragilis* to fresh nutrient agar plates for observation. Those transplanted growths that remain uncontaminated and characteristic of *Streptomyces fragilis* upon repeated transplantation to fresh nutrient agar plates are transplanted to fresh nutrient agar slants and constitute pure cultures of the desired microorganism. *Streptomyces fragilis* has the following characteristics:

When grown in pure culture on a medium containing 1.0 percent dextrose, 0.5 percent peptone (tryptone brand), 0.05 percent dipotassium phosphate, 0.5 percent sodium chloride, 0.01 percent ferrous sulfate heptahydrate, and 2.0 percent agar, the moist young primary mycelium appears colorless to yellow, later turning slightly grey; the aerial secondary mycelium is at first white, later turning pink to tan. Little or no pigment appears in the agar. Streptomyces fragilis has the following microscopic characteristics. The moist primary mycelium is hyaline and branched. The aerial secondary mycelium is branched. Primary, secondary and sometimes tertiary branching occurs and may be alternate, opposite or occasionally whorled. The aerial mycelium is short, straight or slightly curved, and occasionally forms terminal loops or spirals. The distal portions of these aerial hyphae subdivide into conidial chains 8 to 20 microns in length. The conidia are hyaline, spheroidal to avoidal, averaging 1.2 microns in diameter (range 0.8 to 1.5 microns) and 1.5 micron in length (range 1.2 to 2.0 microns).

The microorganism Streptomyces fragilis liquefies gelatin slowly without pigment formation, and peptonizes litmus milk slowly, usually with little change in pH. The organism grows when supplied with $l$-arabinose, cellobiose, dextrine, dextrose, $d$-galactose, maltose, starch, trehalose, and $d$-xylose, and grows poorly when supplied with adonitol, aesculin, dulcitol, $d$-fructose, glycerol, $i$-inositol, inulin, lactose, $d$-mannitol, $d$-mannose, melezitose, melibiose, raffinose, rhamnose, salicin, $d$-sorbitol, and sucrose in a medium containing 0.264 percent ammonium sulfate, 0.238 percent monopotassium phosphate, 0.565 percent dipotassium phosphate, 0.1 percent magnesium sulfate heptahydrate, 0.00064 percent cupric sulfate pentahydrate, 0.00011 percent ferrous sulfate heptahydrate, 0.00079 percent manganese chloride tetrahydrate, 0.00015 percent zinc sulfate pentahydrate, and 1.5 percent agar.

A culture of Streptomyces fragilis is being maintained in the permanent collection of Parke, Davis & Company Culture Bureau, Detroit, Michigan, under No. 04926. A culture of Streptomyces fragilis has also been submitted to the United States Department of Agriculture, Agricultural Research Service at Peoria, Illinois, and deposited in the permanent collection of microorganisms under NRRL No. 2424 by the Culture Collection Unit, Fermentation Section of the Northern Utilization Research Branch.

The following table is a comparison of the appearance of Streptomyces fragilis and known antibiotic-producing Streptomyces when grown on the dextrose-peptone-salts-agar medium described above:

| Species of Streptomyces | Antibiotic Elaborated on Suitable Medium | Mycelium | | | Substrate |
|---|---|---|---|---|---|
| | | Form of Aerial Mycelium | Color of Aerial Mycelium and Spores | Color of Reverse | Color Formed in Agar |
| S. fragilis | O-Diazoacetyl-($l$)-serine | Short, straight to slightly wavy, occ. loops and spirals. | White to light pink to tan | Colorless to yellow to tan | None. |
| S. antibioticus | Actinomycin | Straight | White to grey | Black | Black. |
| S. aureofaciens | Aureomycin | Straight to slightly wavy | do | Yellow to tan | None. |
| S. floridae | Viomycin | do | White to lavender to greyish green. | Purple | Do. |
| S. fradiae | Neomycin, fradicin | Straight, occ. loops and spirals. | White to sea shell pink | Colorless to yellow to tan | Do. |
| S. griseus | Streptomycin, actidione | Straight to slightly wavy | White to light pink to light greyish green. | Colorless to light brown to lavender. | Do. |
| S. griseus | Grisein | do | do | Colorless to tan | Do. |
| S. lavandulae | Streptothricin, lavendulin, streptolin. | Straight, occ. loops and spirals. | White to pink to lavender | Black | Black. |
| S. rimosus | Terramycin | Spirals | White | Yellow | None. |
| S. sp. A105 | Actinorubin | do | White to pink to grey | Pink to red | Do. |
| S. venezuelae | Chloramphenicol | Straight | White to grey | Black | Black. |

The following table is a comparison of the carbo-hydrate utilization of Streptomyces fragilis and known antibiotic-producing Streptomyces when grown on the synthetic agar medium described above, wherein the carbohydrate source is as indicated.

| Species of streptomyces | Carbon source | | | | | | |
|---|---|---|---|---|---|---|---|
| | $l$-Arabinose | Dulcitol | $d$-Fructose | $d$-Galactose | $i$-Inositol | Inulin | Lactose |
| S. fragilis | ++++ | 0 | 0 | +++ | 0 | 0 | Sl + |
| S. antibioticus | ++++ | 0 | ++++ | ++++ | 0 | 0 | ++++ |
| S. aureofaciens | ++++ | 0 | ++++ | ++++ | 0 | 0 | ++ |
| S. floridae | 0 to ++ | 0 | ++++ | ++++ | 0 | 0 to + | + to ++ |
| S. fradiae | ++++ | 0 | 0 to + | ++++ | 0 | 0 to + | Sl + to + |
| S. griseus | 0 to sl + | 0 | ++++ | ++++ | 0 | 0 to sl + | 0 to ++++ |
| S. griseus | ++++ | 0 | ++++ | ++++ | 0 | 0 to sl + | 0 to ++++ |
| S. lavendulae | 0 to ++++ | 0 | 0 to ++++ | Sl + to ++++ | 0 | 0 to sl + | 0 to ++++ |
| S. rimosus | ++++ | 0 | ++++ | ++++ | ++++ | 0 | ++++ |
| S. sp. A105 | ++++ | 0 | ++++ | ++++ | +++ | ++++ | ++++ |
| S. venezuelae | ++++ | 0 | ++++ | ++++ | 0 | 0 | + |

| Species of streptomyces | Carbon source | | | | | | |
|---|---|---|---|---|---|---|---|
| | Maltose | $d$-Manitol | Raffinose | Rhamnose | $d$-Sorbitol | Sucrose | $d$-Xylose |
| S. fragilis | ++++ | 0 | 0 | 0 | 0 | 0 | +++ |
| S. antibioticus | ++++ | ++++ | 0 | +++ | 0 | 0 | ++ |
| S. aureofaciens | ++++ | 0 | 0 | 0 | 0 | ++++ | ++++ |
| S. floridae | ++++ | ++++ | 0 | 0 | 0 to + | 0 to + | ++++ |
| S. fradiae | ++ to +++ | 0 | 0 | 0 | 0 to sl + | 0 to sl + | ++++ |
| S. griseus | ++++ | ++++ | 0 | 0 | 0 to sl + | 0 to sl + | ++++ |
| S. griseus | ++++ | ++++ | 0 | ++++ | 0 to sl + | 0 to sl + | ++++ |
| S. lavendulae | ++++ | ++++ | 0 | 0 to + | 0 | 0 | 0 to ++++ |
| S. rimosus | ++++ | ++++ | + to +++ | 0 | ++++ | 0 | Sl + to + |
| S. sp. A105 | ++++ | ++++ | ++++ | ++++ | 0 to sl + | ++++ | ++++ |
| S. venezuelae | ++++ | 0 | ++++ | ++++ | 0 | ++++ | ++++ |

0 = no growth; + = poor growth; ++ = fair growth; +++ = good growth; ++++ = very heavy growth.

From the two tables given above it will be seen that *Streptomyces fragilis* is very similar to *Streptomyces fradiae* in its appearance on glucose-tryptone-agar and in its carbohydrate utilization. However, these two microorganisms are readily distinguishable by the length of their spore chains, size of spores, color of the spore mass and the products which they are capable of elaborating. These differences are summarized in the following table:

| Characteristic | *Streptomyces fragilis* | *Streptomyces fradiae* |
| --- | --- | --- |
| Length of Spore Chains (usual range). | 8 to 20 microns. | 25 to 70 microns. |
| Size of Spores (mean). | 1.2 x 1.5 micron. | 0.8 x 1.4 micron. |
| Color of Spore Mass. | Light pink to tan. | Sea shell pink. |
| Products Elaborated. | O-Diazoacetyl-(*l*)-serine. | Neomycin, fradicin. |

It is to be understood that for the production of O-diazoacetyl-(*l*)-serine by microbial synthesis we are not limited to this particular organism or organisms obtained from this particular sample of soil or to organisms fully answering the above description which is given merely for illustrative purposes. In particular this invention includes the use of organisms which may be other species of Streptomyces, or other strains of *Streptomyces fragilis*, or mutants produced from the described organism or from any species or strain of Streptomyces by mutating agents such as X-radiation, ultraviolet radiation, nitrogen mustards, etc.

The product of O-diazoacetyl-(*l*)-serine utilizing *Streptomyces fragilis* is carried out by inoculating a suitable sterile aqueous nutrient medium with *Streptomyces fragilis*, incubating the resulting mixture under sterile aerobic conditions at a temperature between about 20 to 35° C., removing the solid material present in the culture mixture and isolating the desired O-diazoacetyl-(*l*)-serine from the aqueous culture liquid.

As inoculum, spores or conidia of *Streptomyces fragilis* as well as aqueous suspensions of the same containing a small amount of soap or other wetting agent may be used. For large fermentations it is preferable to use vigorous, young cultures of *Streptomyces fragilis* rather than the spores or conidia or aqueous suspensions of the spores or conidia.

Suitable aqueus nutrient media are those having a pH between 5.0 and 8.5 and containing carbon and nitrogen sources as well as inorganic salts. The preferred post-sterilization range for the nutrient medium is 6.5 to 7.0. Suitable sources of carbon and nitrogen include inter alia soybean oil meal, wheat gluten meal, brewer's yeast, hog stomach (saline extracted), meat protein hydrolysate, distillers solubles, and corn steep solids. Several combinations of these carbon and nitrogen sources with other nitrogenous materials such as a mixture of soybean oil meal, acid hydrolyzed casein and debittered yeast, a mixture of saline extracted hog stomach and soybean peptone and a mixture of soybean oil meal and acid hydrolyzed casein, have also been found to produce particularly good results. The optimum concentration of these ingredients ranges from 1.5 to 2% of the medium. The carbon source can be composed solely of the aforementioned materials but best results are obtained when glucose or galactose is also added to the medium. The concentration of glucose and galactose can vary from 0 to 2%. Concentrations above 2% appear to have a deleterious effect upon the yield of the desired product. As inorganic salts sodium chloride, ammonium chloride, ammonium nitrate, potassium chloride, calcium carbonate and the like can be used. Ammonium salts such as ammonium chloride and ammonium nitrate are particularly desirable constituents of the medium and lead to higher yields of the desired product. The optimum concentration of these ammonium salts is between 0.1 to 0.5% of the nutrient medium.

The exact nutritional requirements of *Streptomyces fragilis* are not known but from the extensive research which has been conducted it is believed that the carbon and nitro-sources mentioned above contain some undefinable substance or combination of substances which is necessary in order for the microorganism to produce the desired O-diazoacetyl-(*l*)-serine. Many nutrient media containing carbonaceous and nitrogenous materials will support the growth of *Streptomyces fragilis* but for some unknown reason the microorganism is not generally capable of producing the desired O-diazoacetyl-(*l*)-serine in these media. For example, the microorganism grows well but does not produce any O-diazoacetyl-(*l*)-serine in the following media.

Glucose, 1.0%.
Sodium chloride, 0.5%.
Calcium carbonate, 0.1%.
Casein or acid hydrolyzed casein, 1.5%.

Glucose, 1.0%.
Sodium chloride, 0.5%.
Calcium carbonate, 0.1%.
Milk protein, 0.5, 1.0 or 1.5%.

Glucose, 1.0%.
Sodium chloride, 0.5%.
Calcium carbonate, 0.1%.
Special debittered years, 1.0 or 1.5%.

Glucose, 1.0%.
Ammonium chloride, 0.2%.
Sodium chloride, 0.5%.
Calcium carbonate, 0.1%.
Soybean peptone, 1.0 or 1.5%.

The cultivation of *Streptomyces fragilis* in the aqueous nutrient medium can be carried out in a number of different ways. For example, the microorganism can be cultivated under aerobic conditions on the surface of the medium or it can be cultivated beneath the surface of the medium, that is, in the submerged condition, if oxygen is simultaneously supplied.

The preferred method for producing O-diazoacetyl-(*l*)-serine by fermentation on a large scale involves the use of submerged or deep cultures of *Streptomyces fragilis*. According to this embodiment of the invention, a sterile, aqueous nutrient medium is inoculated with *Streptomyces fragilis* and incubated with agitation and aeration at a temperature between about 20–35° C., preferably in the neighborhood of 23–29° C., until a maximum concentration of O-diazoacetyl-(*l*)-serine has been produced in the culture liquid. The length of time required for the maximum production of O-diazoacetyl-(*l*)-serine varies with the size and type of equipment used. For example, in large-scale commercial fermentations such as are carried out in tank-type fermenters maximum production of O-diazoacetyl-(*l*)-serine is reached in about 32 hours or less. When shaken flasks are used for cultivation the time of maximum production may be longer, ranging from three to eight days, than that required for the large-scale fermentation vats. Under submerged culture conditions the microorganism develops as more or less discrete particles dispersed throughout the nutrient medium in contrast to the more or less continuous pellicle present on the surface of the medium in the surface culture method. By virtue of this distribution of the organism throughout the medium, large volumes of the inoculated nutrient medium can be cultivated at one time in the large tanks and vats customarily employed in the fermentation industry. Stationary vat fermenters equipped with suitable agitation and/or aeration devices as well as horizontal rotary drum fermenters have been found to be particularly useful in this respect. However, for the preparation of smaller quantities of the antibiotic or of cultures of the microorganism this submerged culture method may be carried out in small flasks or jars which are either shaken or stirred by suitable mechanic means.

Agitation and aeration of the culture mixture may be accomplished in a number of ways. Agitation may be provided by turbines, paddles, impellers or other mechanical agitation devices, by revolving or shaking the fermenter itself, by various pumping devices or by the passage or air or other oxygen-containing gases through the medium. Aeration may be effected by injecting air or other oxygen-containing gases into the fermentation mixture through open pipes, perforated pipes, pourous diffusion media such as carbon sticks, Carborundum, sintered glass and the like, or it may be provided by spraying, splashing or spilling the mash into or through an oxygen-containing atmosphere.

The surface culture method of producing O-diazoacetyl-(l)-serine involves inoculating a shallow layer, usually less than 2 cm., of a sterile, aqueous nutrient medium with *Streptomyces fragilis* and incubating the mixture under aerobic conditions at a temperature between about 20–35° C., preferably in the neighborhood of 23–29° C. A longer incubation period than that employed in the deep culture method is usually necessary to obtain the maximum production of O-diazoacetyl-(l)-serine. In general, the incubation period is in the neighborhood of three to eight days. After the incubation phase of the process is completed, the mycelium is removed from the liquid containing the desired O-diazoacetyl-(l)-serine and the product isolated from the culture liquid by the methods hereinafter described.

After completion of the fermentation phase of the process, the solid material is removed from the culture liquid, for example, by filtration, centrifugation, etc., and the O-diazoacetyl-(l)-serine isolated from the culture liquid. This isolation can be accomplished in a number of different ways. One of the most convenient of these methods involves concentrating the culture liquid to a small volume such as one-fifth to one-twentieth of the original volume, adding three to ten volumes of a water-miscible organic solvent such as acetone, ethanol, methanol, ethanol-diethyl ether mixture or ethanol-diisopropyl ether mixture and separating the precipitated impurities from the solution. Alternatively, one can evaporate the clarified culture liquid to dryness and extract the dry residue with a water-miscible organic solvent containing less than 50% water. The concentrate or extract so obtained is passed through an absorption column containing a neutral absorbent having a pH or adjusted pH between 5 and 8 and the desired product eluted from the absorbent with water or an aqueous solution of a water-miscible organic solvent containing more than 50% water. Some examples of suitable absorbents are alumina (adjusted to pH 5 to 8), Brockmann's alumina (adjusted to pH 5 to 8) and solid sodium aluminum silicates. The eluate is dried to a fine powder which may contain up to 25% by weight of the desired O-diazoacetyl-(l)-serine. Due to the rather unstable nature of the product it is preferable to remove the water from the eluate by freezing it and subliming the ice therefrom under high vacuum.

The powder prepared as described above is dissolved in a small amount of water, preferably sufficient water to give a solution containing about 3 to 30 mg. of O-diazoacetyl-(l)-serine per cubic centimeter. The pH of the solution is preferably adjusted to pH 6.5 to 7.0. The solution is passed through an activated carbon adsorption column which adsorbs the desired product. The amount of activated carbon required to adsorb all of the desired product from the solution varies with the concentration of the product present in the dried powder. For example, crude material assaying 6 percent of O-diazoacetyl-(l)-serine requires about 4 grams of activated carbon per gram while material assaying 12% of O-diazoacetyl-(l)-serine requires about 5 to 6 g. of activated carbon per gram. Best results are obtained when activated carbon is mixed with diatomaceous earth which serves as a filter aid. After the solution of the dried powder has been poured through the adsorption column, the column is washed with one retention volume of water, that is, the amount of water necessary to wet the column. The wash water is discarded and the desired product eluted by washing the adsorption column with water containing one to twenty-five percent of a water-miscible organic solvent such as acetone, methanol, ethanol, methyl ethyl ketone and the like. The eluate is concentrated to a small volume, usually a solution containing 30 to 80 mg. of the desired product per cubic centimeter, and the O-diazoacetyl-(l)-serine precipitated by the addition of a water-miscible organic solvent such as absolute ethanol, acetone, isopropanol and the like. The mixture is warmed until solution is complete and then cooled. The O-diazoacetyl-(l)-serine so obtained is a crystalline solid which is substantially pure but, if desired, it can be purified further by recrystallization from a mixture of water-pyridine and ethanol. This product is identical in all respects with the material produced by chemical synthetic means.

The following examples illustrate in detail the production of O-diazoacetyl-(l)-serine by microbiological synthetic means.

Example 1

Ten gallons of a nutrient medium having the following composition:

| | Percent |
|---|---|
| Glucose | 1.0 |
| Soybean expeller oil meal | 1.0 |
| Acid hydrolyzed casein | 0.5 |
| Debittered yeast | 0.5 |
| Sodium chloride | 0.5 |

Water sufficient to make 100.0 percent.

is placed in a 30-gallon stainless steel fermenter, the pH adjusted to 7.5 with 6 N sodium hydroxide solution and 0.1% calcium carbonate added. The medium is sterilized by heating at 121° C. for thirty minutes after which the pH of the medium is 6.85. The medium is cooled and inoculated with the spores from two fourteen day old Moyer's sporulation agar slant cultures of *Streptomyces fragilis* suspended in 20 cc. of sterile 0.01% castile soap solution. The culture mixture is incubated at 27° C. for twenty-four hours during which time aeration is supplied through a sparger at the rate of one volume of air per volume of medium per minute. The incubated culture thus obtained is used to inoculate the main culture as described below. One hundred and fifty gallons of a medium having the following composition:

| | Percent |
|---|---|
| Glucose | 1.0 |
| Soybean expeller oil meal | 1.0 |
| Acid hydrolyzed casein | 0.5 |
| Debittered yeast | 0.5 |
| Sodium chloride | 0.5 |
| Ammonium nitrate | 0.25 |

Water sufficient to make 100.0 percent.
6 N sodium hydroxide solution—
 sufficient to bring the pH to 7.5.
Calcium carbonate (added after pH adjustment) ___ 0.1 is placed in a 200-gallon stainless steel fermenter and sterilized by heating at 121° C. for thirty minutes. The medium is cooled, inoculated with the ten-gallon culture of *Streptomyces fragilis* prepared as described above, and incubated at 26° C. for forty-four hours. During the incubation period air is supplied through a sparger at the rate of 1.5 volumes of air per volume of medium per minute and the mixture stirred at the rate of 150 r.p.m. for the first twelve hours and at 300 r.p.m. for the final thirty-two hours, 1.5 gallons of a sterilized mixture of crude lard and mineral oils containing mono- and diglycerides being added as needed to control foaming.

The solid material present in the incubated fermentation mixture is removed by filtration and the filter cake washed with water. The washings are combined with the main filtrate and 110 gallons of this solution stirred with 2079 g. of activated carbon for about one hour. The carbon is removed by filtration and the filter cake washed with deionized water. The combined filtrate and washes (136 gallons) are concentrated in vacuo to a volume of about 20 gallons. Three volumes of acetone are added to the concentrate with stirring, and the precipitate which forms removed by filtration and the filter cake washed with 75 percent aqueous acetone. The combined aqueous acetone filtrate and washings is concentrated in vacuo to a volume of about 19.5 gallons, the concentrate so obtained frozen and dried from the frozen state under high vacuum.

One kilogram of dry powder is extracted with one 10-liter portion of 90% (by volume) ethanol followed by extraction with one 2-liter portion of the same solvent. The combined extracts (about 12 liters) are diluted with sufficient water to reduce the ethanol concentration to 75% by volume, and this alcoholic solution passed through an adsorption column prepared as described below.

Three kilograms of alumina are stirred with dilute hydrochloric acid so that the pH remains constant at 7.7. The alumina is removed, washed with water and activated by heating at 200° C. for four hours. The alumina is stirred with 75% aqueous ethanol and packed into an adsorption column having a diameter of 4 inches. The total packed volume is approximately 3500 cc.

The alcoholic solution prepared above is added to the adsorption column at the rate of six liters per hour and the percolate discorded. The column is washed with 35 liters of 75% ethanol (by volume), the washing discarded and the column finally washed with 21 liters of 50% ethanol. Some O-diazoacetyl-(l)-serine may be detected in the last wash solution. After the washing has been completed the adsorbed O-diazoacetyl-(l)-serine is eluted from the adsorption column by passing 17.5 liters of distilled water through the column. The aqueous eluate is concentrated and frozen and the concentrate dried from the frozen state under high vacuo. The powder thus obtained, a O-diazoacetyl-(l)-serine content of 5.8%.

Five hundred grams of the material assaying 5.8 percent O-diazoacetyl-(l)-serine is dissolved in 1,320 milliliters of water. A column of activated charcoal is prepared. A mixture of 2 kilograms of activated charcoal (Darco G–60) and 2 kilograms of diatomaceous earth is packed as a thick slurry in a six inch column. The pH of the water is 5.2 to 5.5. With this bed, a head of 4 feet of solvent is necessary to achieve a suitable flow rate. After packing, the column is washed with water for several hours to settle and remove solubles. The solution is applied to the column with positive pressure equivalent to a head of four foot of water. One retention volume of 9 liters of water is then applied to the column. This is followed by a 5 percent acetone solution. The total solvent flow is 36 liters. The colorless eluate is discarded. The elution front which is easily detected is a light yellowish-green solution. This solution is retained. The solution is concentrated by vacuum distillation until a concentration of 20 to 25 milligrams per milliliter is reached. This solution is applied to a column prepared in an identical manner as described herein and treated by the same procedure as the primary adsorption. The percolate is concentrated by vacuum distillation until a concentration of 60 to 75 milligrams per milliliter is reached. The quantity of solution is now approximately 300 milliliters. Absolute alcohol (450 ml.) is added. The solution is gently warmed to complete solution and then stored at 5° C. for several hours. The O-diazoacetyl-(l)-serine which separates in crystalline form is collected and purified by recrystallization from 60 to 70 percent ethanol;

$$E_{1\,cm.}^{1\%} = 1140 \text{ at } 250.5 \text{ m}\mu$$

in an aqueous buffer of pH 7. The chemical and other biological and physical properties of the product are the same as those described in the foregoing description.

*Example 2*

Eighteen liters of a medium having the following composition:

| | Percent |
|---|---|
| Glucose | 1.0 |
| Soybean oil meal | 1.0 |
| Debittered yeast | 0.5 |
| Hydrolyzed casein | 0.5 |
| Ammonium nitrate | 0.25 |
| Sodium chloride | 0.5 |

Water sufficient to make 100.0 percent.
Sodium hydroxide quantity sufficient to bring the pH to 7.5.

| | |
|---|---|
| Calcium carbonate | 0.1 |
| Lard (antifoam) | 1.0 | are placed in a 30-liter glass fermenter equipped with stainless steel fittings including sparger, impeller, baffles and sampling line and the medium sterilized by heating at 250° F. for two hours. The post-sterilization pH of the medium is 6.8. The medium is cooled and inoculated with 10 cc. of a suspension of the spores from one fourteen-day old Moyer's sporulation agar slant culture of *Streptomyces fragilis* in sterile 0.01% castile soap solution. The culture mixture is incubated at 27° C. for eighty-eight hours during which time the mixture is stirred at 350 r.p.m. and air is passed into the medium through the sparger at the rate of 1.4 volumes per volume of medium per minute.

Ten liters of the incubated culture mixture are filtered using 100 g. of a filter aid and the filter cake washed with one liter of distilled water. The combined filtrate and washing are concentrated in vacuo at a temperature of 40° C. or less to a volume of about 2 liters and the pH adjusted to 7 with sodium hydroxide solution. Three volumes of acetone are added with vigorous stirring and the black oily precipitate which settles out separated from the supernatant. The precipitate is washed with two 500 cc. portions of 75% acetone, the washings combined with acetone supernatant and the pH adjusted to 7.

The solution is concentrated in vacuo to a volume of 1200 cc., the concentrate frozen and the ice sublimed therefrom under high vacuo. The O-diazoacetyl-(l)-serine present in this crude preparation can be isolated as described in Example 1 above.

*Example 3*

Ten gallons of a nutrient medium having the following compositions:

| | Percent |
|---|---|
| Glucose | 0.1 |
| Soybean oil meal | 1.0 |
| Hydrolyzed casein | 0.5 |
| Debittered yeast | 0.5 |
| Sodium chloride | 0.5 |

Water sufficient to make 100.0 percent.
6 N sodium hydroxide solution sufficient to bring the pH to 7.5.

| | |
|---|---|
| Calcium carbonate | 0.1 |

Crude lard and mineral oil mixture, 75 cc.

is placed in a 30-gallon stainless steel fermenter and the medium sterilized by heating it at 121° C. for thirty minutes. The post-sterilization pH of the medium is 6.65. The medium is cooled and inoculated with the spores from two fourteen-day old Moyer's sporulation agar slant cultures of *Streptomyces fragilis* suspended in 20 cc. of sterile 0.01% castile soap solution. The culture mixture is incubated at 26° C. for twenty-four hours during which time aeration is supplied through a sparger at the rate of one volume of air per volume of medium per minute. The incubated culture thus obtained is used to inoculate the main culture as described below.

One hundred and fifty gallons of the above described medium (except the antifoam) is placed in a 200-gallon stainless steel fermenter and sterilized by heating it at 120° C. for thirty minutes. The medium is cooled, inoculated with the ten-gallon culture of *Streptomyces fragilis* prepared as described above and incubated at 26° C. for forty-eight hours. During the incubation period air is supplied to the medium through a sparger at the rate of 1.5 volumes per volume of medium per minute and the mixture stirred at 150 r.p.m. for the first twelve hours and 300 r.p.m. for the last thirty-six hours, two gallons of crude lard and mineral oil mixture being added as needed to prevent foaming.

The solid material present in the incubated fermentation mixture is removed by filtration, the filter cake washed with water and the washings added to the filtrate. The solution (approximately 140 gallons) is stirred with activated carbon (concentration 5 g./liter) for one hour, the carbon removed by filtration and the filter cake washed with 15 gallons of deionized water. The combined filtrate and washings is concentrated in vacuo to a volume of about 19 gallons and three volumes of acetone added with stirring. The supernatant is decanted from the precipitate which separates and the precipitate washed with 75% acetone. The acetone washings are added to the supernatant and the solution concentrated in vacuo to a volume of about 19 gallons. The concentrate is frozen and the ice sublimed therefrom under high vacuo. The O-diazoacetyl-(*l*)-serine present in the crude powder so obtained can be isolated by the method described in Example 1 above.

*Example 4*

200 cc. portions of a medium having the following composition:

| | Percent |
|---|---|
| Glucose | 1.0 |
| Saline extracted hog stomach | 1.0 |
| Ammonium chloride | 0.2 |
| Sodium chloride | 0.5 |
| Sodium hydroxide to pH 7.5. | |
| Calcium carbonate | 0.1 | is placed in each of several one-liter Erlenmeyer flasks capped with gauze-covered absorbent-cotton pads. The medium in the flasks is sterilized by heating it with steam at 120° C. for twenty minutes and cooled. The pH of the sterilized medium is 6.8 to 7.2. Each of the flasks is inoculated with 2.0 cc. of a spore suspension prepared by suspending the spores from one glucose-tryptone-agar slant culture of *Streptomyces fragilis* in 20 cc. of 0.01 percent castile soap solution under aseptic conditions. The cultured flasks are incubated with agitation on a machine rotating at 160 r.p.m. in a 2⅜-inch diameter for sixty-six hours at 26° C.

*Example 5*

Employing a procedure essentially similar to that described in Example 3, 1025 gallons of a medium containing 200 lbs. commercial glucose, 100 lbs. soybean expeller oil meal, 50 lbs. saline extracted hog stomach, 50 lbs. sodium chloride, 17.7 lbs. ammonium chloride, and 10 lbs. calcium carbonate is prepared in a 2000 gallon Inconel-clad fermentor, seeded with 135 gallons of a nine hour culture, and incubated with aeration and mechanical stirring for thirty-one hours. When the harvested beer is processed as described in Example 1, approximately 130 grams of O-diazoacetyl-(*l*)-serine are obtained.

What we claim is:

1. Process for the production of O-diazoacetyl-(*l*)-serine which comprises inoculating a sterile aqueous nutrient medium having a pH between 5.0 and 8.5 and containing suitable sources of carbon and nitrogen and mineral salts with *Streptomyces fragilis*, incubating the resulting mixture under aerobic conditions at a temperature between about 20 and 35° C., removing the solid material present in the culture mixture and isolating the O-diazoacetyl-(*l*)-serine from the aqueous culture liquid.

2. Process for the production of O-diazoacetyl-(*l*)-serine which comprises inoculating a sterile aqueous nutrient medium having a pH between 6.5 and 7.0 and containing suitable sources of carbon and nitrogen and mineral salts with *Streptomyces fragilis*, incubating the inoculated nutrient medium at a temperature between 23 and 29° C. while agitating said inoculated medium and introducing sterile air thereinto thereby causing the mircoorganism to develop as discrete particles dispersed throughout said medium separating the solid material present in the culture mixture and isolating the O-diazoacetyl(*l*)-serine from the aqueous culture liquid.

3. Process for the production of O-diazoacetyl-(*l*)-serine which comprises inoculating a sterile aqueous nutrient medium having a pH between 5.0 and 8.5 and containing mineral salts and at least one member of the class consisting of soybean oil meal, wheat gluten meal, brewer's yeast, saline extracted hog stomach, meat protein hydrolysate, distillers solubles and corn steep solids with *Streptomyces fragiles*, incubating the resulting mixture under aerobic conditions at a temperature between about 20 and 35° C. removing the solid material present in the culture mixture and isolating the O-diazoacetyl-(*l*)-serine from the aqueous culture liquid.

4. Process for the production of O-diazoacetyl-(*l*)-serine which comprises inoculating a sterile aqueous nutrient medium having a pH between 6.5 and 7.0 and containing mineral salts, less than 2% of a sugar of the class consisting of glucose and galactose, 1.5 to 2% of at least one member of the class consisting of soybean oil meal, wheat gluten meal, brewer's yeast, saline extracted hog stomach, meat protein hydrolysate, distillers solubles and corn steep solids and between 0.1 and 0.5% of an inorganic ammonium salt with *Streptomyces fragilis*, incubating the inoculated nutrient medium at a temperature between 23 and 29° C. while agitating said inoculated medium and introducing sterile air thereinto thereby causing the microorganism to develop as discrete particles dispersed throughout said medium, separating the solid material present in the culture mixture and isolating the O-diazoacetyl-(*l*)-serine from the aqueous culture liquid.

5. In a process for the production of O-diazoacetyl-(*l*)-serine, the method of isolating O-diazoacetyl-(*l*)-serine from culture liquids containing the same which comprises concentrating the culture liquid to a small volume, adding three to ten volumes of a water-miscible organic solvent to the concentrate, separating the insoluble impurities from the solution, passing the solution through an adsorption column containing an adsorbent of the class consisting of alumina adjusted to pH 5 to 8 and sodium aluminum silicate, discarding the eluate, eluting the adsorbed O-diazoacetyl-(*l*)-serine with a solvent of the class consisting of water and aqueous water-miscible organic solvent mixtures containing more than 50% water, removing the solvents from the eluate containing the O-diazoacetyl-(*l*)-serine, dissolving the residue in a small amount of water, passing the solution through an adsorption column containing activated carbon, discarding the eluate, eluting the adsorbed O-diazoacetyl-(*l*)-serine with water containing 1 to 25% of a water-miscible organic solvent, concentrating the eluate to a small volume and precipitating the O-diazoacetyl-(*l*)-serine in substantially pure form by the addition of a water-miscible organic solvent.

6. In a process for the production of O-diazoacetyl-(*l*)-serine, the method of isolating O-diazoacetyl-(*l*)-serine from culture liquids containing the same which comprises evaporating the culture liquid to dryness, extracting the residue with a water-miscible organic solvent containing less than 50% water, passing the extract through an adsorption column containing an adsorbent of the class consisting of alumina adjusted to pH 5 to 8 and sodium aluminum silicate, discarding the eluate, eluting the adsorbed O-diazoacetyl-(*l*)-serine with a solvent of the class consisting of water and aqueous water-miscible organic solvent mixtures containing more than 50% water, removing the solvents from the eluate containing the O-diazoacetyl-(l)-serine, dissolving the residue in a small amount of water, passing the solution through an adsorption column containing activated carbon, discarding the elutate, eluting the adsorbed O-diazoacetyl-(l)-serine with water containing 1 to 25% of a water-miscible organic solvent, concentrating the eluate to a small volume and precipitating the O-diazoacetyl-(l)-serine in substantially pure form by the addition of a water miscible organic solvent.

7. In a process for the production of O-diazoacetyl-(l)-serine, the method of isolating O-diazoacetyl-(l)-serine from culture liquids containing the same which comprises concentrating the culture liquid to a small volume, adding three to ten volumes of ethanol to the concentrate, separating the insoluble impurities from the solution, passing the solution through an adsorption column containing alumina adjusted to pH 5 to 8, discarding the eluate, eluting the adsorbed O-diazoacetyl-(l)-serine with water, removing the water from the eluate containing the O-diazoacetyl-(l)-serine, dissolving the residue in sufficient water to produce a solution containing 3 to 30 mg. of O-diazoacetyl-(l)-serine per cubic centimeter, passing the solution through an adsorption column containing activated carbon, eluting the adsorbed O-diazoacetyl-(l)-serine with water containing one to twenty-five percent acetone, concentrating the eluate to a small volume and precipitating the O-diazoacetyl-(l)-serine in substantially pure form by the addition of ethanol.

8. In a process for the production of O-diazoacetyl-(l)-serine, the method of isolating O-diazoacetyl-(l)-serine from culture liquids containing the same which comprises evaporating the culture liquid to dryness, extracting the residue with ethanol containing less than 50% water, passing the extract through an adsorption column containing alumina adjusted to pH 5 to 8, discarding the eluate, eluting the adsorbed O-diazoacetyl-(l)-serine with water, removing the water from the eluate containing the O-diazoacetyl-(l)-serine, dissolving the residue in sufficient water to produce a solution containing 3 to 30 mg. of O-diazoacetyl-(l)-serine per cubic centimeter, passing the solution through an adsorption column containing activated carbon, eluting the adsorbed O-diazoacetyl-(l)-serine with water containing one to twenty-five percent acetone, concentrating the eluate to a small volume and precipitating the O-diazoacetyl-(l)-serine in substantially pure form by the addition of ethanol.

9. Process for the production of O-diazoacetyl-(l)-serine which comprises inoculating a sterile aqueous nutrient medium having a pH between 5.0 and 8.5 and containing suitable sources of carbon and nitrogen and mineral salts with *Steptomyces fragilis*, incubating the resulting mixture under aerobic conditions at a temperature between about 20 and 35° C., removing the solid material present in the culture mixture, concentrating the culture liquid, adding three to ten volumes of a water-miscible organic solvent to the concentrate, separating the insoluble impurities from the solution, passing the solution through an adsorption column containing an adsorbent of the class consisting of alumina adjusted to pH 5 to 8 and sodium aluminum silicate, discarding the eluate, eluting the adsorbed O-diazoacetyl-(l)-serine with a solvent of the class consisting of water and aqueous water-miscible organic solvent mixtures containing more than 50% water, removing the solvents from the eluate containing the O-diazoacetyl-(l)-serine, dissolving the residue in a small amount of water, passing the solution through an adsorption column containing activated carbon, discarding the eluate, eluting the adsorbed O-diazoacetyl-(l)-serine with water containing 1 to 25% of a water-miscible organic solvent, concentrating the eluate to a small volume and precipitating the O-diazoacetyl-(l)-serine in substantially pure form by the addition of a water-miscible organic solvent.

References Cited in the file of this patent

UNITED STATES PATENTS

| | | |
|---|---|---|
| 2,490,714 | Searle | Dec. 6, 1949 |
| 2,540,284 | Peck | Feb. 6, 1951 |
| 2,628,931 | Nunheimer | Feb. 17, 1953 |

FOREIGN PATENTS

| | | |
|---|---|---|
| 1,013,753 | France | May 1952 |

OTHER REFERENCES

Geschicter, J.A.M.A., February 1, 1930, pages 326–328.

Williams: An Introduction to Chromatography, pages 18–19, London, 1946.

Swart: Proc. Soc. Expt'l Biol. and Med., vol. 73, March 1950, pages 376, 377.

La Manna et al.: Basic Bacteriology, Williams & Wilkins, 1953, pages 27–28.

Waksman et al.: Actinomycetes and Their Antibiotics, Williams & Wilkins, 1953, pages 214–215.